Patented Sept. 12, 1922.

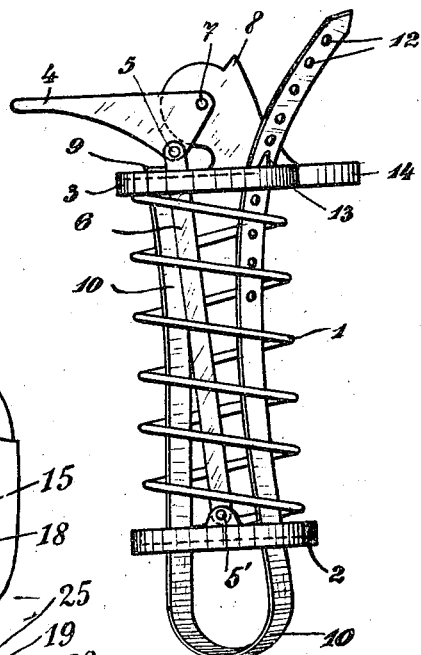
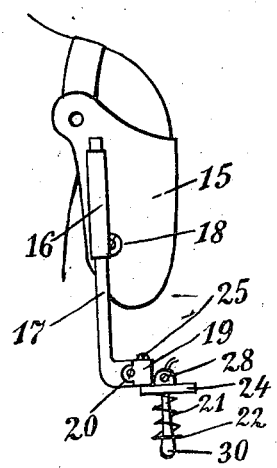
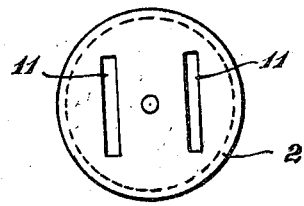

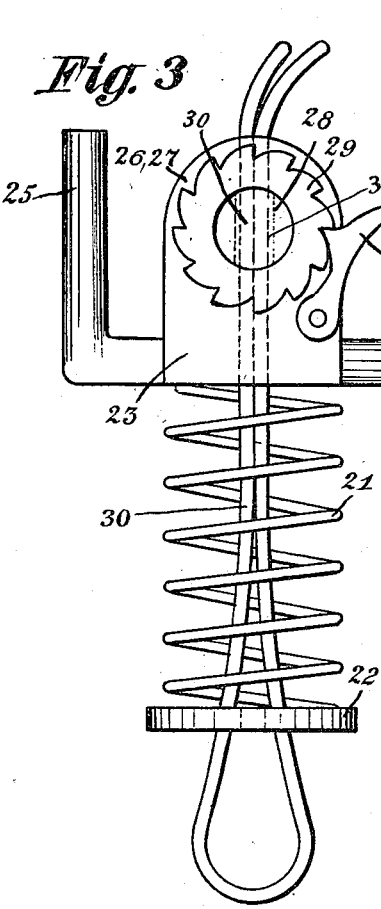
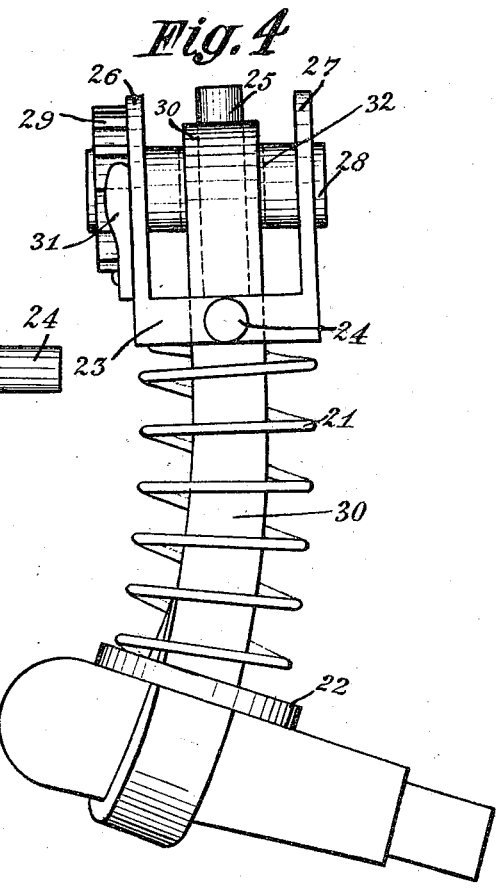
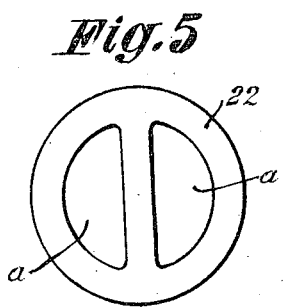

1,429,111

UNITED STATES PATENT OFFICE.

OSKAR SEMELEDER, OF VIENNA, AUSTRIA.

CLAMPING DEVICE FOR ARTIFICIAL ARMS.

Application filed March 15, 1921. Serial No. 452,538.

*To all whom it may concern:*

Be it known that I, OSKAR SEMELEDER, a citizen of the realm of Austria, residing at V. Franzensgasse 24, Vienna, Austria, have invented an Improved Clamping Device for Artificial Arms, of which the following is a specification.

The invention has for its object a device designed to afford connection between an artificial arm and the wrist or between the arm and both wrist and hand. In the former case a special artificial hand is fixed on it.

The drawing shows two illustrations of such a device both adapted to serve as toolholders instead of the hand.

Fig. 1 is a perspective view of the whole device,

Fig. 2 a plan view of a part,

Fig. 3 an elevation of a modified device,

Fig. 4 a side view of Fig. 3,

Fig. 5 a plan view of a part and,

Fig. 6 a diagrammatical view showing the manner of connecting the device with the artificial arm or with a socket fixed on an arm-stump.

In Fig. 1 a spiral spring 1 is placed between a ferrule or disc 2 and a bracket-plate 3. the upper part of which is the bearing for a lever 4, pivotally connected to it at 7. A pulling member 6 (rope, belt, chain or the like) leads from the disc 2 to the lever 4, being fastened on the latter by the pivot 5 and to the former by the pivot 5'. When the lever 4 is turned upwards, it pulls the disc 2 and compresses the spring 1. A stop 8 provided on the upper part of the plate 3 limits the movement of the lever 4.

Inside the spring a belt 10 is seen, passing through the holes 11 of the disc 2 (separately shown by Fig. 2) and forming a loop underneath the disc. By pulling up the disc the loop is enlarged and thus made ready to take up the handle of a tool or any other object to be clasped by it. For adjusting the size of the loop to the size of any such object the belt 10, the one end 9 of which is securely fastened on the plate 3, is on the other end provided with holes 12, by means of which the belt may at different lengths be fastened on a hook or tongue 13 projecting from the plate 3.

This adjustable belt at the same time serves also for regulating the tension of the spring 1. For work requiring the use of both arms as for instance mowing, raking, threshing, etc., the spring is only slightly to be compressed, the small tension enabling it to follow all movements of the tool clasped by the loop. If the artificial limb has to work alone when using a hammer or the like, the spring has to be compressed strongly to avoid sidewise movements of the parts of the device itself or of the tool.

The fastening of this device on an artificial arm or on a socket fixed on an armstump may be done by a part 14 projecting from the plate 3.

For introducing an object into the loop and fixing it, first of all the lever 4 is turned up and the spring compressed. After the belt has been released and the object inserted into the loop, the free end of the belt is pulled up as far as possible and then fastened on the hook 13 of the plate 3. If now the lever 4 is turned down again into the position shown by Fig. 1, the spring causes a tight clasping of the object by the loop.

In the modified form of the device shown by Figures 3 and 4 the spiral spring 21 is placed between the disc 22 and the plate 23. A round bar comprising the arms 24, 25, bent rectangularly, is fixed on this plate in such way, that the device may be fixed on the artificial arm either by the end 24 or by the end 25 of this bar, as will be described farther on.

The plate 23 is provided with two vertical standard-plates 26, 27 serving as bearings for the shaft or drum 28. This shaft 28 carries a cogwheel or ratchet 29, engageable by a pawl 31. The ends of the belt 30 forming a loop pass through the holes *a* of the disc 22 (Fig. 5) the inside of the spring, the plate 23 and a slot 32 provided in the drum 28. If the object to be clasped is inserted into the loop and the shaft 28 turned by means of a key or a crank fixed on it, the belt will be wound up on the drum and the tool will be firmly clamped by the loop at the same time being pulled up together with the disc 22 and compressing the spring 21. Now the tool may be turned at will in any direction of the plane of the disc 22. If it is desired to incline the tool in a vertical plane also as shown by Fig. 4, this can easily be effectuated, if the holes *a* of the disc are enlarged in such manner as to leave a free space on the edges of the belt. Now if the belt from its central position glides to the one end of the hole or the other, it will press one side of the spring more than the other. The spring and the disc will thus be shifted and the tool will assume any inclined position desired. The belt glides automatically into the necessary position, if the clamped tool is forced in the desired direction.

The fixing of the device on the artificial arm or on a socket by means of the part 14 (Fig. 1) or one of the parts 24 or 25 (Fig. 3) may be done in different ways. It can be fixed directly on a socket 15 (Fig. 6) covering the armstump or else on a bar 17, which can glide in a guide 16 and be fixed by a thumb-screw or winged nut 18, the guide 16 being fixed on the socket 15. The rod 17 is of angular shape, and its short arm is provided with a hole to receive one of the parts 14, 24 or 25 which then can be immobilized by the thumb-screw 20.

By this arrangement the tool may be fixed at different distances from the armstump and in any position or direction required.

The spring 1 (Fig. 1) or 21 (Fig. 3) may also be replaced by a piece of india-rubber shaped accordingly.

What I claim and desire to secure by Letters Patent is:

1. A clamping-device for attaching implements to artificial limbs, comprising a relatively stationary bearing member, a relatively movable bearing member, a resilient member interposed between and bearing against said bearing members, and a flexible, inelastic member passing through said bearing members and bent upon itself to form a loop disposed beneath said movable bearing member.

2. A clamping-device for attaching implements to artificial limbs, comprising a stationary bearing member, a movable bearing member, a resilient member interposed between and bearing against said bearing members, and a flexible inelastic member having one end thereof secured to said stationary bearing member and its other end passed loosely through said movable bearing member, said flexible inelastic member being bent upon itself to form a loop disposed beneath said movable member.

3. A clamping-device for attaching implements to artificial limbs, comprising a stationary bearing member, a movable bearing member, a resilient member interposed between and bearing against said bearing members, a flexible inelastic member having one end thereof secured to said stationary bearing member and its other end passed loosely through said movable bearing member, said flexible inelastic member being bent upon itself to form a loop disposed beneath said movable member, and means for moving said movable bearing member toward said stationary bearing member to compress said resilient member.

4. A clamping-device for attaching implements to artificial limbs, comprising a stationary bearing member, a movable bearing member, a resilient member interposed between and bearing against said bearing members, a flexible inelastic member having one end thereof secured to said stationary bearing member and its other end passed loosely through said movable bearing member, said flexible inelastic member being bent upon itself to form a loop disposed beneath said movable member, and lever-actuated means for moving said movable bearing member toward said stationary bearing member to compress said resilient member.

5. A clamping-device for attaching implements to artificial limbs, comprising a stationary bearing member, a movable bearing member, a resilient member interposed between and bearing against said bearing members, a flexible inelastic member having one end thereof secured to said stationary bearing member and its other end passed loosely through said movable bearing member, said flexible inelastic member being bent upon itself to form a loop disposed beneath said movable member, and means, comprising a lever-actuated strap secured to said movable bearing member, for moving it toward said stationary bearing member to compress said resilient member.

6. A clamping-device for attaching implements to artificial limbs, comprising a relatively stationary bearing member carrying an angled rod, a relatively movable bearing member, a resilient member interposed between and bearing against said bearing-members, and a flexible inelastic member passing through said bearing-members and bent upon itself to form a loop disposed beneath said movable bearing member.

7. The combination with a socket-member adapted to be secured over the stump of a human arm and carrying a tubular element, of an angled rod adapted to be projected into said tubular element, a stationary bearing-member secured to said rod, a movable bearing-member, a resilient member disposed between and bearing against said bearing-members, and a flexible inelastic member passing through said bearing-members and bent upon itself to form a loop projecting beneath said movable bearing member.

OSKAR SEMELEDER.